United States Patent [19]

Smith

[11] Patent Number: 5,064,551

[45] Date of Patent: Nov. 12, 1991

[54] DEICING COMPOSITIONS

[75] Inventor: Roy P. Smith, Hull

[73] Assignee: BP Chemicals Limited, London, England

[21] Appl. No.: 448,694

[22] Filed: Dec. 11, 1989

[30] Foreign Application Priority Data

Dec. 20, 1988 [GB] United Kingdom ............... 8829701

[51] Int. Cl.$^5$ ............................................. C09K 3/18
[52] U.S. Cl. ....................................... 252/70; 106/13; 252/76; 252/79
[58] Field of Search ..................... 252/70, 75, 76, 74, 252/79; 106/13

[56] References Cited

U.S. PATENT DOCUMENTS

| | | | |
|---|---|---|---|
| 2,233,185 | 2/1941 | Smith | 252/76 |
| 3,362,909 | 1/1968 | Georgal et al. | 252/70 |
| 4,254,166 | 3/1981 | Glanville et al. | 252/70 |
| 4,338,209 | 7/1982 | Manabe et al. | 252/75 |

FOREIGN PATENT DOCUMENTS

| | | |
|---|---|---|
| 305351 | 6/1972 | Austria . |
| 0111767 | 11/1982 | European Pat. Off. . |
| 174433 | 1/1935 | Switzerland . |
| 1111936 | 5/1968 | United Kingdom . |
| 2049650 | 12/1980 | United Kingdom . |
| 8401955 | 5/1984 | World Int. Prop. O. . |

*Primary Examiner*—Paul Lieberman
*Assistant Examiner*—Christine A. Skane
*Attorney, Agent, or Firm*—Brooks Haidt Haffner & Delahunty

[57] ABSTRACT

This invention relates to deicing compositions which contain alkali metal salts of (a) acetates and/or formates, (b) phosphates and (c) nitrites in aqueous solution and has a pH value in the range from 9.5–11.2. This composition is environment friendly and does not give rise to acute corrosion problems associated with compositions used hitherto.

10 Claims, No Drawings

DEICING COMPOSITIONS

The present invention relates to deicing compositions which have negligible corrosivity.

It is well known that during winter snow and ice cause serious hazard to the movement of traffic in the highways, runways and taxiways. Also, deicing of aircraft, especially the main wings thereof, is of great importance since the formation of ice on the wings can effectively alter the profile of the wing thereby creating non-laminar flows which in turn increases the pressure over the wing and reduces lift. It is a major exercise for local authorities to minimise any delays or accidents caused by such adverse conditions and by providing a maintenance service for these areas which will allow safe movement of traffic.

The most common and effective deicing chemical is sodium chloride, especially for temperatures down to about $-6°$ C. Although sodium chloride is readily available as common salt and is economic to a point, it presents serious problems of corrosion to structural steel and road vehicles, and environmentally has adverse effects on vegetation and drainage systems.

In order to minimise these corrosive effects more recently formulations containing urea have been used as a deicing agent. However, urea also has the following disadvantages;

(a) urea decomposes into ammonia which is toxic to fish even in low concentration;

(b) any water abstracted for potable supply may give rise to treatment problems especially in respect of chlorination of the abstracted water if ammonia is present;

(c) urea can act as a fertiliser thereby promoting the growth of weeds and algae in rivers and waterways;

(d) urea is ineffective at temperatures below $-11.5°$ C. for melting ice;

(e) urea has, in solution above or below its eutectic point concentration, a freezing point higher than $-11.5°$ C.;

(f) granules (or prills) of urea are easily blown off dry runways; and (g) urea has been found to be corrosive to metals and alloys used in aircraft manufacture e.g. steel and magnesium alloys.

In order to mitigate the above problems, glycol based formulations have been proposed as deicing agents. In particular, monoethylene-, diethylene- and triethyleneglycols have been favoured. Of these monoethylene glycol exerts a high biological oxygen demand (BOD) whereas the other two glycols are resistant to biodegradation and hence present problems of pollution and contamination of rivers and waterways.

It has now been found that these problems of corrosion and environmental pollution can be significantly reduced by using a formulation free from any of the aforementioned chemicals.

Accordingly, the present invention is a deicing composition comprising an aqueous solution of an alkali metal acetate and/or an alkali metal formate, an alkali metal phosphate and an alkali metal nitrite, said composition having a pH value in the range of 9.5-11.2.

In the compositions of the present invention the acetate and/or formate used is that of sodium or potassium and is preferably potassium acetate and/or formate.

The amount of the acetate and/or formate used in the composition is suitably 45-60% w/w, and is preferably 50-53% w/w.

Again, the phosphate present in the composition is suitably sodium or potassium phosphate and is preferably potassium phosphate. The phosphate is suitably present in the composition in an amount of 0.1-0.4% w/w, preferably from 0.15-0.25% w/w.

The alkali metal nitrite is suitably sodium or potassium nitrite and is preferably sodium nitrite. The nitrite is suitably present in the composition in an amount of 0.2-0.6% w/w, preferably from 0.3-0.5% w/w.

The remainder of the composition to make up the 100% is water in which the above mentioned components are dissolved. Water is usually present in an amount from 45-55% w/w.

The compositions of the present invention optionally contain ethylenediaminetetraacetic acid. The amount of ethylenediaminetetraacetic acid (EDTA) if present, is suitably 0.2-0.7% w/w and is preferably from 0.5-0.6% w/w. The water content of the compositions is then adjusted accordingly.

Depending upon the concentration of the individual components in the composition, the pH of the composition may vary. It is, however, essential to adjust the pH of the composition prior to use to a value from 9.5 to 11.2 by adding appropriate amounts of either an alkali metal hydroxide or acetic acid. Thus when no EDTA is present, the pH of the compositions is preferably 10.8 to 11.2. Where EDTA is present the pH of the composition is preferably from 9.5 to 10.

The compositions of the present invention have a eutectic temperature below $-40°$ C.

The present invention is further illustrated with reference to the following Examples:

EXAMPLE 1

A typical deicing composition of the present invention has the following components in the proportion shown:

50% w/w potassium acetate
0.5% w/w EDTA (ethylene diamine tetra-acetic acid)
0.2% w/w potassium phosphate
0.4% w/w sodium nitrite
48.9% w/w water This composition has a pH range of 9.5-10.0.

Tests on the above typical composition at sewage treatment works in Thames and Severn-Trent Water Authority regions of the UK showed that the product fully degraded in the treatment works and exerted a much more acceptable biological oxygen demand than monoethylene glycol based products.

UK Ministry of Defence specification TS 10228A refers to glycol based de-icer performance. The above typical composition meets the stringent requirement of this specification with respect to aerospace material corrosion.

SPECIFICATION:
Wt. loss —0.0050 g max.
Wt. gain —0.0010 g max.

TABLE 1

| | TS 10228A METAL CORROSION TEST (168 hours, 20° C. ± 2° C., Full Immersion) | |
|---|---|---|
| Metal | Typical Composition (undiluted) | Typical Composition (Diluted 50/50 in Std. Hard Water) |
| Cadmium | | |
| Plated Steel | —0.0040 g | —0.0043 g |
| Mg Alloy | —0.0047 g | —0.0047 g |
| Al Alloy | —0.0014 g | —0.0034 g |

TABLE 1-continued

TS 10228A METAL CORROSION TEST
(168 hours, 20° C. ± 2° C., Full Immersion)

| Metal | Typical Composition (undiluted) | Typical Composition (Diluted 50/50 in Std. Hard Water) |
|---|---|---|
| Copper | −0.0037 g | −0.0042 g |
| Steel | −0.0014 g | −0.0016 g |

EXAMPLE 2

A further deicing composition of the present invention has the following components in the proportion shown:

50% w/w potassium acetate
0.2% w/w potassium phosphate
0.4% w/w sodium nitrite
49.4% w/w water This composition has a pH range of 10.8–11.2.

Tests on the above typical composition at sewage treatment works in Thames and Severn-Trent Water Authority regions of the UK as in Example 1 and showed that the product fully degraded in the treatment works and exerted a much more acceptable biological oxygen demand that monoethylene glycol based products.

TABLE 2

TS 10228A METAL CORROSION TEST
(168 hours, 20° C. ± 2° C., Full Immersion)

| Metal | Typical Composition (undiluted) | Typical Composition (Diluted 50/50 in Std. Hard Water) |
|---|---|---|
| Cadmium | | |
| Plated Steel | −0.0035 g | −0.0015 g |
| Mg Alloy | −0.0007 g | −0.0008 g |
| Al Alloy | −0.0002 g | −0.0005 g |
| Copper | −0.0020 g | −0.0006 g |
| Steel | −0.0001 g | −0.0001 g |

The compositions of the present invention have the following advantages over conventional deicing compositions.

(1) They are less corrosive to metals and alloys used in aircraft manufacture than compositions containing urea and meet the stringent standards of corrosivity especially with regard to cadmium plated steels, magnesium alloys, aluminium alloys and copper;

(2) They are unique in that they are based on acetate salts as the major component;

(3) They have lower biological oxygen demand than monoethylene glycol;

(4) They are more easily biodegraded than diethylene glycol or triethylene glycol;

(5) They have the quickest low temperature ice melting properties when compared with urea and glycol based products.

(6) They are non-hazardous to the environment, as tested under the OECD Guidelines No. 203 and EEC Directive 67/548 Annex VCI as published in 84/449/EEC and gave a value of 96 hours $LC_{50}$ greater than 1000 mg/liter for rainbow trout.

I claim:

1. A deicing composition comprising an aqueous solution of from 45–60% w/w of an alkali metal carboxylate selected from the group consisting of an alkali metal acetate, an alkali metal formate and mixtures thereof from 0.1–0.4% w/w of an alkali metal phosphate, and from 0.2–0.6% w/w of an alkali metal nitrite, said composition having a pH value in the range of 9.5–11.2.

2. A composition according to claim 1 wherein the acetate and/or formate is that of sodium or potassium.

3. A composition according to claim 1 wherein the phosphate is that sodium or potassium.

4. A composition according to claim 1 wherein the nitrite is that of sodium or potassium.

5. A composition according to claim 1 wherein the amount of water in the composition is from 45–55% w/w.

6. A composition according to claim 1 wherein said composition comprises potassium acetate, potassium phosphate, sodium nitrite and water and the composition has a pH value in the range 10.8–11.2.

7. A composition according to claim 6 wherein said composition comprises 50–53% w/w potassium acetate, 0.15–0.25% w/w potassium phosphate, 0.3–0.5% w/w sodium nitrite and 45–55% w/w water.

8. A composition according to claim 1 wherein the amount of alkali metal carboxylate is from 45–60% w/w, the acetate is a sodium or potassium acetate and the formate is a sodium or potassium formate; the amount of phosphate is from 0.1–0.4% w/w and the phosphate is a sodium or potassium phosphate; the amount of nitrite is from 0.2–0.6% 2/2 and the nitrite is a sodium or potassium nitrite.

9. A composition according to claim 1 further comprising ethylenediaminetetraacetic acid.

10. A composition according to claim 8 further comprising ethylenediaminetetraacetic acid and having a pH from 9.5 to 10.

* * * * *

UNITED STATES PATENT AND TRADEMARK OFFICE
CERTIFICATE OF CORRECTION

PATENT NO. : 5,064,551

DATED : November 12, 1991

INVENTOR(S) : Roy P. Smith

It is certified that error appears in the above-identified patent and that said Letters Patent is hereby corrected as shown below:

Column 4:

Claim 2, line 2, strike "acetate and/or formate" and insert --alkali metal carboxylate-- in lieu thereof Claim 6, line 2, last word, correct the spelling of "potassium"

Signed and Sealed this

Twenty-third Day of March, 1993

Attest:

STEPHEN G. KUNIN

Attesting Officer

Acting Commissioner of Patents and Trademarks